United States Patent [19]

Drake et al.

[11] 4,131,481

[45] Dec. 26, 1978

[54] POLYMER COMPOSITION

[75] Inventors: Paul H. Drake, London; Colin J. Humphris, West Ewell; John E. Preedy, Croydon, all of England

[73] Assignee: The British Petroleum Company Limited, London, England

[21] Appl. No.: 780,275

[22] Filed: Mar. 22, 1977

[30] Foreign Application Priority Data

Apr. 7, 1976 [GB] United Kingdom ............... 14081/76

[51] Int. Cl.$^2$ ............................................. C04B 21/02
[52] U.S. Cl. .................................... 521/91; 106/40 R; 106/86; 106/122; 521/92; 521/94; 521/88; 521/149; 260/42.13
[58] Field of Search ............... 106/122, 40 R; 264/42; 65/22; 260/2.5 M, 2.5 B

[56] References Cited

U.S. PATENT DOCUMENTS 3,560,231  2/1971  Moore ..................... 264/42

FOREIGN PATENT DOCUMENTS 1316129  5/1973  United Kingdom.

OTHER PUBLICATIONS

Chem. Abst: 84:139,972n.

Primary Examiner—Theodore Morris
Attorney, Agent, or Firm—Brooks, Haidt, Haffner & Delahunty

[57] ABSTRACT

This specification relates to foams produced from ion leachable glass and a polycarboxylic acid.

11 Claims, No Drawings

POLYMER COMPOSITION

The present invention relates to a composition of matter and in particular to a structural foam material.

Structural foams such as aerated concretes and cements and foamed polymeric materials such as polyurethane and polystyrene are well-known. Such foams suffer from various disadvantages; for example, aerated cements suffer from brittleness, low compressive strength and poor resistance to acid attack; polymer foams suffer from low rigidity and low compressive strength.

It is an object of the present invention to provide a structural foam material which substantially overcomes the aforesaid disadvantages.

It is also known to produce a surgical or dental cement by reaction of certain fluoroaluminosilicate glasses with surgically acceptable water soluble polycarboxylic acids. Thus British Patent Specification No. 1 316 129 (N.R.D.C.) describes a process for the preparation of a surgical cement which comprises mixing a fluoroaluminosilicate glass powder wherein the ratio by weight of silica to alumina is from 1.5 to 2.0 and the ratio by weight of fluorine to alumina is from 0.6 to 2.5, or wherein the ratio by weight of silica to alumina is from 0.5 to 1.5 and the ratio by weight of fluorine to alumina is from 0.25 to 2.0 with a surgically acceptable water soluble poly (carboxylic acid) having a relative viscosity of from 1.05 to 2.00 in the presence of water. Relative viscosity is defined as the viscosity measured with a capillary viscometer of a 1% by weight to volume solution of the poly (carboxylic acid) in twice molar sodium hydroxide solution at 25° C. relative to the viscosity of the twice molar sodium hydroxide solution.

Accordingly, the present invention is a structural foam material comprising the foamed reaction product of an ion leachable glass and a polycarboxylic acid in the presence of water.

According to a further embodiment, the present invention is a process for making structural foam material comprising mixing ion-leachable glass powder with an aqueous solution of a polycarboxylic acid to form a paste-like cement mass and curing said cement mass in the presence of a blowing agent.

The ion-leachable glass is preferably an aluminosilicate glass and most preferably a fluoroaluminosilicate glass. This may be prepared for instance by fusing mixtures of silica ($SiO_2$), alumina ($Al_2O_3$), cryolite ($Na_3AlF_6$) and fluorite ($CaF_2$) in the appropriate proportions at temperatures above 950° C. The preferred fusion temperatures are in the range 1050 to 1350° C. After fusion the glass may be poured off and cooled rapidly, for example, in air or water or some combination of both. The proportions of the different elements in the glass are approximately the same as the proportions of the same elements present in the starting mixture. Some fluorine may, however, be lost during the reaction, for example, up to 20% by weight, and an allowance should be made for this in deciding the proportions of the reactants in the mix.

The preferred polycarboxylic acids are those prepared by homopolymerisation and co-polymerisation of unsaturated aliphatic carboxylic acids and co-polymerisation of these acids with other unsaturated aliphatic monomers, for example, acrylamide and acrylonitrile. The homo-polymers and co-polymers of acrylic acid are particularly preferred.

The cement is formed by reaction of the glass suitably in the form of a powder with an aqueous solution of the polycarboxylic acid by mixing the two components to form a paste which on curing forms a hard ceramic-like mass. The normal cure times are of the order of about five minutes although addition of complexing co-monomers such as tartaric acid and ethylene diamine tetra-acetic acid (EDTA) result in a lengthening of the working time, followed by a sharp gellation.

The production of a structural foam in accordance with the invention may be carried out in a number of different ways. Thus, for example, the cement mass may be blown with a gas, e.g. air or nitrogen, during the curing period. This method results in a substantially open cell structure foam. Alternatively a blowing agent such as a volatile halohydrocarbon may be incorporated into the cement mass under pressure, after which on release of pressure, rapid evaporation of the blowing agent causes foaming of the mass. A particularly preferred class of blowing agents are the so-called internal blowing agents produced by reaction of an additive with the cement, e.g. carbon dioxide. Thus, for example, a metal carbonate such as calcium carbonate added to the mass reacts with the polycarboxylic acid producing gaseous carbon dioxide and calcium carboxylate. Evolution of the carbon dioxide causes foaming of the mass leaving the residual calcium salt which is compatible with the cement. The foams produced by use of an internal blowing agent are substantially closed cell foams. Finally the invention contemplates the production of a so-called "syntactic foam" by incorporation of hollow glass or plastic resin spheres into the cement mass prior to cure. The glass spheres may or may not be formed from an ion-leachable glass.

The cement mass may also contain a surface active agent to assist both the mixing of the various components and the foaming stage and also additional filler or binder materials, e.g. fibrous materials, to assist in the formation of a rigid structural mass.

The foamed mass may be moulded prior to cure into any desirable shape, e.g. an insulating building block or brick, by injecting the foam whilst still plastic into a suitable mould.

The following examples illustrate the manufacture of structural foams according to the invention. The ion-leachable glass and polycarboxylic acid solutions used in each of the examples were identical, the glass being prepared as follows.

The following compounds were mixed by milling and then heated for about 2 hours in a sillimanite crucible at 1150° C. until homogeneous.

$SiO_2$: 175 g
$Al_2O_3$: 100 g
$Na_3AlF_6$: 30 g
$AlPO_4$: 60 g
$CaF_2$: 207 g
$AlF_3$: 32 g

The resultant glass was cooled rapidly and dried and crushed until it passed through a 350 mesh B.S. sieve. The glass was found to have a fluorine content of 21.6% by weight (the theoretical value, assuming no loss of fluorine in the reaction, was 22.8% by weight).

The polycarboxylic acid was polyacrylic acid having a molecular weight of 23,630 (measured by viscometry)

in the form of an aqueous solution of concentration 44.6% by weight.

EXAMPLE 1

A mixture was made of the following components

|  | Parts by weight |
|---|---|
| Ion leachable glass | 2.00 |
| Blowing agent, calcium carbonate powder | 0.04 |
| Polyacrylic acid solution | 1.13 |

The calcium carbonate used was a commercial filler sieved to 32 μm. The three components were mixed with a spatula for 75 seconds and the resulting gel cured at 37° C. and < 97% relative humidity for 24 hours. The resulting foam had the following properties:
Foam density: 950 kg m$^{-3}$
Compressive strength: 10.1 MN m$^{-2}$

EXAMPLE 2

As before a mixture was made of the following components

|  | Parts by weight |
|---|---|
| Ion leachable glass | 2.0 |
| Hollow glass microspheres | 0.4 |
| Polyacrylic acid solution | 1.0 |

The hollow glass microspheres used were a proprietary product supplied by Armoform Marketing Limited, their diameters ranging from 10–250 μm with a mean of 100 μm. The components were mixed and cured as in Example 1. The resulting structural foam had the following properties:
Density: 1580 kg m$^{-3}$
Compressive strength: 32 MN m$^{-2}$

We claim:

1. A structural foam material comprising the foamed reaction product of the paste-like cement mass obtained upon mixing an ion-leachable glass selected from the group consisting of an aluminosilicate and a fluoroaluminosilicate with a polycarboxylic acid in the presence of water.

2. A structural foam material according to claim 1 wherein the ion-leachable glass is prepared by fusing a mixture comprising silica, alumina, cryolite and fluorite at a temperature above 950° C.

3. A structural foam according to claim 1 wherein the polycarboxylic acid is polyacrylic acid.

4. A process for making structural foam material comprising mixing ion-leachable glass powder selected from the group consisting of an aluminosilicate and a fluoroaluminosilicate with an aqueous solution of a polycarboxylic acid to form a paste-like cement mass and curing said cement mass in the presence of a blowing agent.

5. A process according to claim 4 wherein a complexing co-monomer selected from tartaric acid and ethylene diamine tetra acetic acid is added to the cement mass prior to curing.

6. A process according to claim 4 wherein the blowing agent is selected from air, nitrogen, carbon dioxide and a volatile halohydrocarbon.

7. A process according to claim 6 wherein the blowing agent carbon dioxide is formed in situ by adding a metal carbonate to the cement mass prior to curing.

8. A process according to claim 4 wherein hollow spheres of a material selected from glass and plastic resin are incorporated into the cement mass prior to cure.

9. A process according to claim 4 wherein the cement mass contains additional filler or binder material.

10. A structural foam material according to claim 1 wherein said foamed product is cured.

11. A process according to claim 4 wherein said polycarboxylic acid is polyacrylic acid.

* * * * *